United States Patent [19]

Bayne

[11] 3,753,241

[45] Aug. 14, 1973

[54] SHIFT REGISTER HAVING INTERNAL BUFFER

[75] Inventor: John Wallace Bayne, Earley, England

[73] Assignee: Sperry Rand Limited, New York, N.Y.

[22] Filed: Nov. 18, 1971

[21] Appl. No.: 199,955

[30] Foreign Application Priority Data

Nov. 26, 1970 Great Britain .................. 56,189/70

[52] U.S. Cl. .......................... 340/172.5, 307/221 R

[51] Int. Cl. ............................ G06f 5/00, H03k 5/13

[58] Field of Search ................... 340/172.5, 174 SR; 307/221 R; 328/37

[56] References Cited

UNITED STATES PATENTS

| | | | |
|---|---|---|---|
| 3,670,179 | 6/1972 | Pike | 307/221 R |
| 3,274,566 | 9/1966 | McGrogan, Jr. | 340/172.5 X |
| 3,398,403 | 8/1968 | Ostendorf, Jr. | 340/172.5 |
| 3,543,243 | 11/1970 | Nordquist | 340/172.5 |
| 3,593,298 | 7/1971 | Armstrong | 340/172.5 |

*Primary Examiner*—Paul J. Henon
*Assistant Examiner*—Melvin B. Chapnick
*Attorney*—Howard P. Terry

[57] ABSTRACT

A shift register which includes an internal buffer for eliminating clock skew. The first and last cells of the register are driven by common clock pulses and the intermediate cells thereof and the buffer are driven by second and third clock pulses, respectively, having the same nominal rate as the common clock pulses. A plurality of such registers may be utilized in a digital data processing system where the first and last cells of the registers are all driven by the common clock pulses.

9 Claims, 6 Drawing Figures

SHIFT REGISTER HAVING INTERNAL BUFFER

BACKGROUND OF THE INVENTION

This invention relates to digital data processing apparatus such as computers or processors, and arrays of logic elements used in other apparatus, in which a plurality of serially-connected shift registers are used to process data, and to such registers per se.

One of the main advantages of such serial apparatus is that the number of electrical or electronic components is minimised as compared with parallel apparatus in which data is fed out simultaneously in a plurality of channels, each of which channels are separate whereby duplication of components results. However, a serious disadvantage of serial apparatus compared with parallel apparatus resides in the time taken to process data. In parallel apparatus all bits of a word are processed virtually simultaneously whereas in serial apparatus the bits are processed in sequence or serially which clearly takes a greater time to effect. Hence it is desirable that the data processing rate or time in serial apparatus is not increased further by timing problems. At present in serial apparatus clocking signals to the registers are passed through respective gating circuits each of which has its own time delay and inevitably the time delays are unequal. If this is so and the delays are also less than the individual storage cell delays of the respective registers, mistransfer of data can result. This incorrect timing of clocking signals through the gating circuits is called clock skew and in order to avoid it in known arrangements, extra time delays have to be introduced, with the undesired result that the time taken to process data is increased.

SUMMARY OF THE INVENTION

An object of the present invention is to provide digital data processing apparatus having a plurality of serial shift registers and in which clock skew is eliminated without affecting the data processing rate.

According to one aspect the invention provides a shift register comprising three or more data storage cells, at least the first and last storage cells, but not all the cells, being driven by common clock pulses, and buffer means connected to the input of at least one of the storage cells not driven by said common clock pulses, the latter storage cells being driven by second clock pulses time-related or logically related to said common clock pulses, and the buffer means being driven by third clock pulses time-related or logically related to said common clock pulses or by said second clock pulses, the second and third clock pulses having the same nominal rate as the common clock pulses.

With this arrangement, the same clock pulses are applied to each register but need not continuously be applied, i.e., they may only be applied when required and interrupted when not required.

According to another aspect the invention provides digital data processing apparatus having a plurality of shift registers as set out above which are serially connected together.

The provision of the buffer means in each register affords the necessary time delay to avoid clock skew but the location thereof is such that it does not result in an increase in the data processing rate over and above the maximum rate dictated by the inherent time delays of the components employed.

Digital processing apparatus in accordance with the invention finds many applications and may be used to advantage in processing data from navigational aids and inertial navigation systems, and in the engine-room control of navigation equipment in marine vessels, for example. It may also be used to process and route messages transmitted over a communications network to and from a message switching relay centre. Furthermore, the invention may be applied to on-line process control, to communication terminals with a major computer, and to an air intake control system for a gas turbine in which the digital data processing apparatus is employed to produce control signals for means operable to vary the air intake to the gas turbine.

BRIEF DESCRIPTION OF THE DRAWINGS

Digital data processing apparatus embodying the invention will now be described in greater detail, by way of example, with reference to the accompanying drawings, in which.

DESCRIPTION OF THE PREFERRED EMBODIMENT

Figure 1:
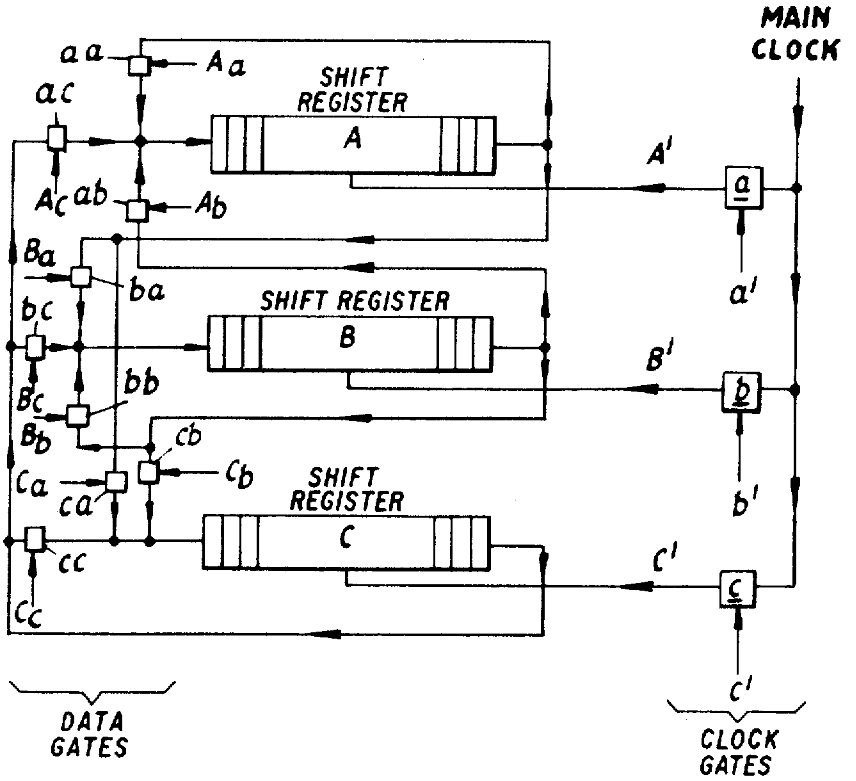
FIG. 1 is a diagrammatic representation of typical data processing apparatus employing serially-connected shift registers.

With reference to FIG. 1, three interconnected shift registers A, B and C are provided each having a plurality of individual data storage cells and being controlled by three types of signals, namely:

1. A main clock signal consisting of a repetitive train of pulses related to the number of storage cells in the registers A, B and C.
2. Two-state control signals $a'$, $b'$, $c'$, as appropriate, which in one state allow the main clock pulses to pass through to the corresponding register and in the other state prevent the main clock pulses from so passing.
3. Two-state control signals $A_a$, $A_b$, $A_c$, $B_b$, $B_a$ etc., which in one state allow the output of one register to pass to the remaining registers, and in the other state prevent this passage of data.

With this arrangement, when a control signal, for example signal $a'$, changes state in synchronism with the main clock waveform, the data stored in the cells of register A are shifted from one cell to the next on the occurrence of each clock pulse. If, for example, the signals $c'$ and $C_a$ also change state so that register C too receives a train of main clock pulses and the output from register A provides the input signal $C_a$ to the gate *ca*, the output of which forms the input to register C, the information previously stored in the cells of register A is transferred, cell by cell, into Register C. At the end of the train of main clock pulses, the signals referred to may be set to the alternative state to prevent further transfer of data. At this point in time, the data stored in register A could be either the exact replica of the data previously stored in register C or a logical or arithmetical function of any one of the registers, or a combination thereof, according to the properties of the circuits used for controlling the data inputs to the various registers.

Figure 2:
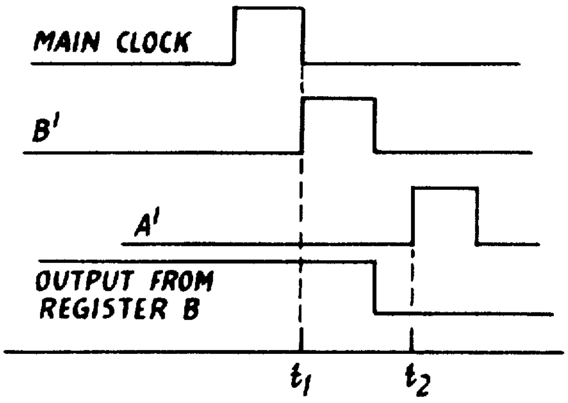
FIGS. 2 and 3 are explanatory timing diagrams.
Figure 3:
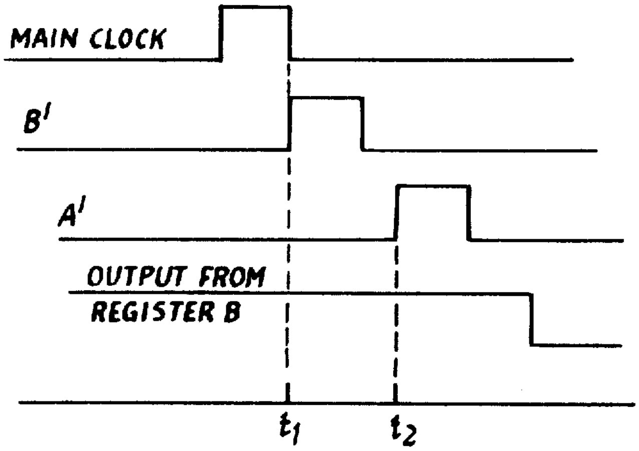

In a practical system, the signals passing through each of the gating circuits *a* , *b* , *c* , suffer a time delay and similarly, the change in output from a storage cell may be delayed relative to the clock pulse. If the delays through the various gates *a* , *b* , *c* are unequal and greater than the storage cell delay, mistransfer of data may result. For example, if as shown in FIG. 2 the delay through the gating circuit *a* is greater than the combination of the delay through the gate *b* , a gate *ab*, and the output from the last storage cell in register B, data will be lost if control signals are applied to transfer data from register B to register A. This is because at time $t_1$ the output from the last storage cell of register B is changed to represent the previous state of the penultimate storage cell, and at time $t_2$ the input to register A is the previous state of the penultimate cell of B. This data is transferred into register A and the previous state of the last storage cell of register B is lost. This incorrect timing of the clock outputs from the gates *a* , *b* , *c* is called clock skew. Ideally, the waveform timing should be as shown in FIG. 3 where the clock signal applied to register A appears before the output from the last storage cell of register B changes state due to the clock pulse output from the gate *b* .

Figure 4:
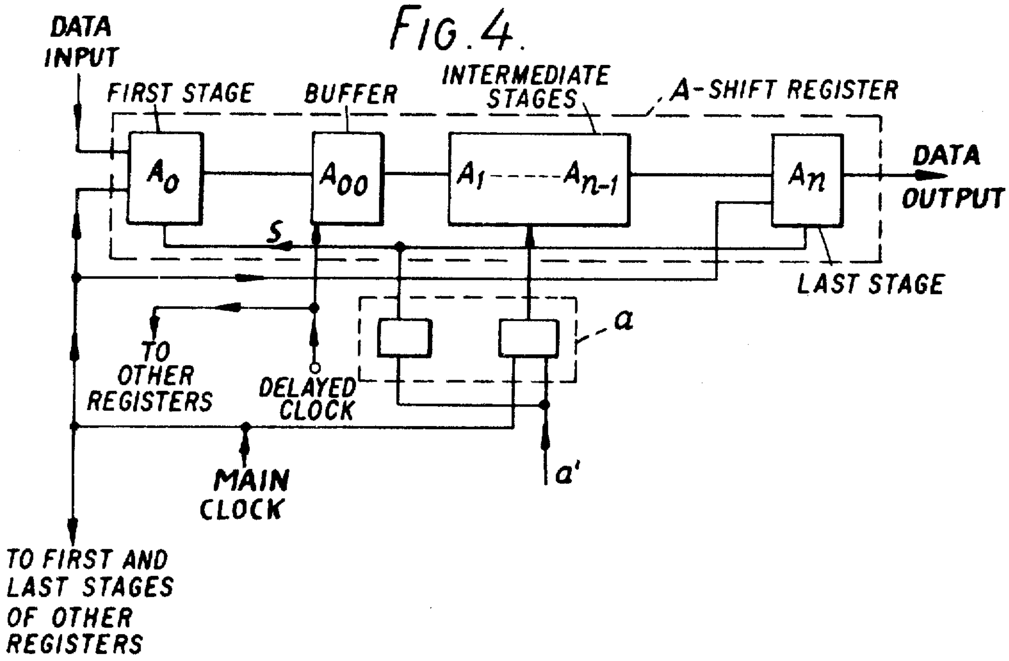
FIG. 4 is a schematic layout of a shift register in accordance with the invention.

Referring now to FIG. 4, the serial shift register in accordance with the invention comprises an input data storage cell $A_o$ and an output data storage cell $A_n$ which receive the main clock pulses simultaneously with the input and output storage cells of other associated registers such as those equivalent to the registers B and C of the arrangement of FIG. 1. The register also comprises buffer means in the form of a buffer data storage cell $A_{oo}$, the input of which is connected to the output of the input storage cell $A_o$ and the output of which is connected to the input of the first of a plurality of intermediate cells $A_1 \ldots A_{n-1}$. Circuits for processing the control signal s and the main clock waveform are provided. The input and output storage cells $A_o$, $A_n$ are of a type such that when the control signal *s* is in one state no action takes place, and when the control signal *s* is in the other state a clock pulse causes the storage cell to be set to the same state as the input.

As the input and output cells $A_o$, $A_n$ receive main clock pulses simultaneously with the first and last storage cells of other registers, there can be no mistransfer of data between the last storage cell of one register and the first storage cell of another. The buffer storage cell $A_{oo}$ receives delayed clock pulses or clock pulses of a state opposite to the main clock pulse, or is of a type which is set to the state of the input to it by pulses of state opposite to those which drive the first and last storage cells $A_o$, $A_n$. The timing of the waveforms applied to the first cell $A_o$ and to the buffer cell $A_{oo}$ is such that the buffer cell stores the state of the first cell for a certain time after the first cell has changed state. The intermediate storage cells $A_1$ to $A_{n-1}$ receive clock pulses from the gating circuits timed relative to the main clock so that the data stored in the buffer cell is transferred into the cell $A_1$ at the same time as the data in the cell $A_{n-1}$ is transferred to the cell $A_n$.

The maximum allowable repetition rate of the main clock pulses depends on the delays in the data transmission paths between registers. By placing the buffer stage internal to the shift register rather than external (in the data transmission path) the clock skew problem is eliminated without affecting the maximum allowable repetition rate obtained without a clock skew protection system. This repetition rate depends on the characteristics of the components used but an 8MH$_z$ train has been used and upwards of 15MH$_z$ appears feasible in some applications.

Figure 5:
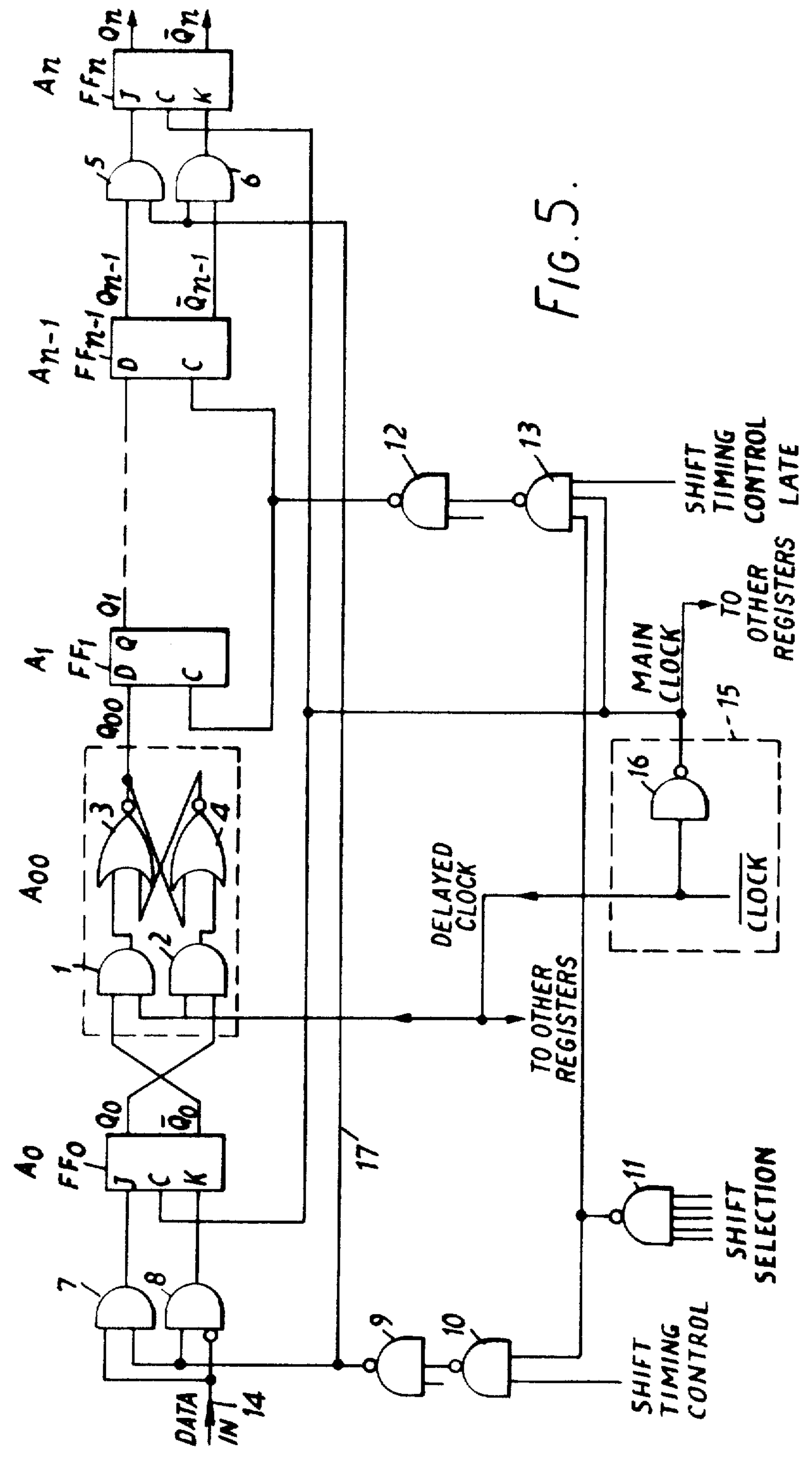
FIG. 5 is a more detailed circuit diagram of the register of FIG. 4.

FIG. 5 illustrates a practical realisation of the register of FIG. 4 using TTL components. The first and last storage cells $A_o$, $A_n$ are in the form of JK-type flip flops $FF_o$, $FF_n$. The buffer storage cell $A_{oo}$ is formed from two AND gates 1, 2 and two NOR gates 3, 4, and the intermediate cells $A_1 \ldots A_{n-1}$ of the register comprise D-type flip flops $FF_1 \ldots FF_{n-1}$. Two AND gates 5, 6 are interposed between the output cell $A_n$ and the penultimate cell $A_{n-1}$ , and two more AND gates 7, 8 are provided at the input to the first cell $A_o$ the gates 5, 6, 7 and 8 each receiving a control signal via three NAND gates 9, 10 and 11. The main clock pulses drive the first and last cells $A_o$, $A_n$ directly, and the main clock pulses drive the intermediate cells $A_1 \ldots A_{n-1}$ through NAND gates 12 and 13. Thus the latter cells are driven by clock pulses time-related to the main clock pulses as is the buffer cell $A_{oo}$ which is driven by inverted main clock pulses ($\overline{\text{CLOCK}}$). The main clock pulses are derived from the $\overline{\text{CLOCK}}$ pulses in a main timing unit 15 by a NAND gate 16.

The characteristics of the JK flip flops $A_o$ and $A_n$ are such that if a logica' ONE signal is present at the J or K inputs when a clock pulse occurs on the C input, the Q output of the flip flop is set to logical ONE or logical ZERO, respectively. If there is a logical ZERO at both J and K inputs when the clock pulse occurs at the C input, the state of the flip flop is unaltered. The shift of data into $A_o$ and $A_n$ is, therefore, controlled by the output of the gate 9, a logical ONE signal allowing the states of cells $A_o$ and $A_n$ to be set according to signals on the DATA IN line 14 and on the output of cell $A_{n-1}$, respectively.

The characteristics of the D-type flip flops $FF_1 \ldots FF_{n-1}$ are such that a clock pulse from the gate 12 causes the Q output to be set to the same state as the D input. With regard to the buffer cell $A_{oo}$, a $\overline{\text{CLOCK}}$ pulse at the inputs to the gates 1 and 2 causes the output $Q_{oo}$ of the gate 3 to be set to ZERO by a ONE at the $\overline{Q}_o$ output of $FF_o$ or to ONE by a ONE output of $FF_o$.

Figure 6:
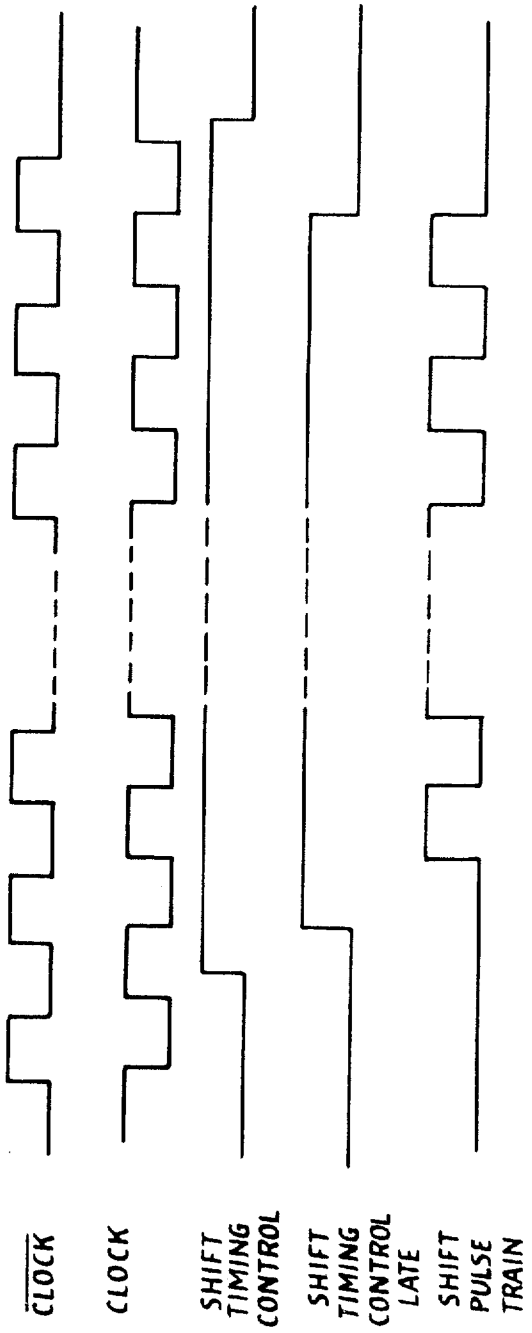
FIG. 6 is a further explanatory timing diagram.

FIG. 6 shows the relevant timing diagram. The $\overline{\text{CLOCK}}$ signal is a continuous pulse train and the main clock signal is generated from the $\overline{\text{CLOCK}}$ signal, the delay in the gate 16 being sufficient to ensure that the $\overline{\text{CLOCK}}$ signal falls to ZERO before the main clock signal becomes a logical ONE. Therefore, $\overline{\text{CLOCK}}$ falls to ZERO before the main clock pulse operates to change the state of the cell $A_o$, the buffer $A_{oo}$ storing the previous state of cell $A_o$. If any one of the shift selection signals becomes a logical ZERO, the output from the gate 11 becomes ONE so that when the shift timing control signals occur on line 17, a shift control signal is applied to the first and last cells $A_o$, $A_n$ and a train of clock pulses is applied to the cells $A_1 \ldots A_{n-1}$.

Thus again, the buffer cell $A_{oo}$ avoids clock skew without reducing the data processing rate of the apparatus which is governed solely by the characteristics of the components employed. Therefore, for a specified type of logic elements, a maximum rate of data transfer, a minimum number of logic elements, and a minimum number of electrical loads on the common clock is achieved by the invention. Hence a processing rate more nearly comparable than known serial systems with an equivalent parallel system is obtained while benefiting from the advantages of fewer components and smaller size of a serial system.

I claim:

1. A shift register including a first storage cell, a last storage cell and at least one intermediate storage cell coupled therebetween, the combination comprising means for driving at least said first and last storage cells but not all the cells with common clock pulses, buffer means coupled to the input of at least one of the storage cells not driven by said common clock pulses, means for driving said storage cells not driven by said common clock pulses with second clock pulses having the same nominal rate as said common clock pulses, and means for driving said buffer means with third clock pulses having the same nominal rate as said common clock pulses.

2. A shift register according to claim 1, wherein each cell driven by said common clock pulses comprises a JK-type flip flop and each cell driven by said second clock pulses comprises a D-type flip flop.

3. A shift register according to claim 2 further including a first pair of AND gates coupling data signals to the J and K inputs of said first storage cell respectively, and a second pair of AND gates coupling the outputs of the last of said intermediate storage cells to the J and K inputs of said last storage cell of said register respectively, said first and second pair of AND gates being coupled to receive control signals whereby to control shifting data into said first and last storage cells of said register.

4. A shift register according to claim 1, wherein said buffer means comprises two AND gates and a pair of cross-coupled NOR gates, said AND gates being connected in series with respective ones of said NOR gates.

5. A shift register according to claim 4 wherein said AND gates are connected to receive said third clock pulses.

6. Digital data processing apparatus comprising a plurality of shift registers as claimed in claim 1, the registers being serially connected together.

7. Digital data processing apparatus according to claim 6 further including means for applying the same common clock pulses to each register when required and for interrupting said common clock pulses when they are not required.

8. A shift register according to claim 1 wherein at least one of said second and third clock pulses are time-related to said common clock pulses.

9. A shift register according to claim 1 wherein at least one of said second and third clock pulses are logically-related to said common clock pulses.

* * * * *